J. E. TUCKER.
UNIVERSAL JOINT FOR DRIVE SHAFTS.
APPLICATION FILED JAN. 19, 1920.
1,362,652.
Patented Dec. 21, 1920.
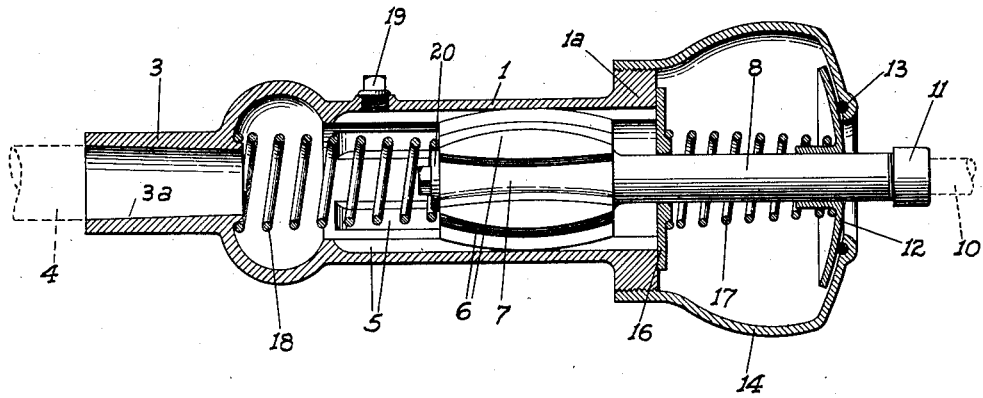
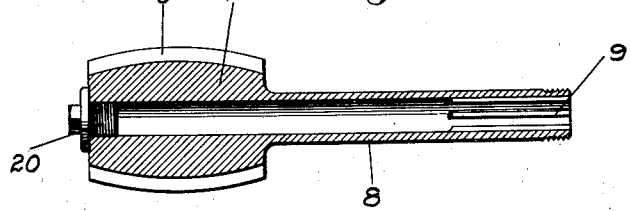
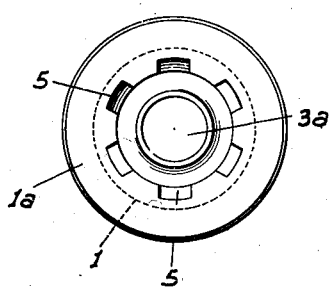 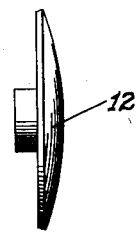
INVENTOR.
J. E. Tucker
BY
ATTORNEY

UNITED STATES PATENT OFFICE.

JAMES E. TUCKER, OF SACRAMENTO, CALIFORNIA.

UNIVERSAL JOINT FOR DRIVE-SHAFTS.

1,362,652.

Specification of Letters Patent.

Patented Dec. 21, 1920.

Application filed January 19, 1920. Serial No. 352,246.

*To all whom it may concern:*

Be it known that I, JAMES E. TUCKER, a citizen of the United States, residing at Sacramento, in the county of Sacramento, State of California, have invented certain new and useful Improvements in Universal Joints for Drive-Shafts; and I do declare the following to be a full, clear, and exact description of the same, reference being had to the accompanying drawings, and to the characters of reference marked thereon, which form a part of this application.

This invention relates to improvements in universal joints for drive shafts, and is especially adapted for use in connection with the drive or propeller shaft of automobiles and like vehicles, in which the plane of the driven member is constantly changing relative to the plane of the driving member.

The principal object of the invention is to provide a universal joint by means of which the shaft may not only have a bending flexibility, but which will also be flexible in a longitudinal direction; that is, it may automatically be lengthened or shortened without altering or destroying the driving power transmitted.

Another object is to provide a very efficient device for the purpose, and one in which no undue strains will be placed on any of the parts when one portion of the shaft is turning at an angle relative to the other portion.

The foregoing and other objects I accomplish by means of such structure and relative arrangement of parts as will fully appear by a perusal of the following specification and claims.

In the drawings similar characters of reference indicate corresponding parts in the several views.

Figure 1 is a longitudinal section through my improved universal joint.

Fig. 2 is a detached section of the male member of the joint.

Fig. 3 is an end view of the casing or female member.

Fig. 4 is a detached view of a curved washer or bearing plate.

Referring now more particularly to the characters of reference on the drawings, the numeral 1 denotes a rigid casing provided with a tubular sleeve 3 at one end, which sleeve is preferably taper-bored as at 3ª to receive the end of a driven shaft 4.

This casing is provided with a plurality of longitudinal spline ways 5 adapted to receive the splines 6 of a relatively short hub or boss 7, from which extends a shaft 8 beyond the casing 1 and in the opposite direction to the sleeve 3.

The outer end of this shaft is bored and splined as at 9 to receive the end of a drive shaft 10 therein, this shaft being held in position by means of a cap 11 screwed onto the end of the shaft 8.

Slidably mounted on the shaft 8 is a curved plate 12, the curvature of which is radial from a point on the axis of the member 7 and approximately central of the length thereof. The outer faces of the splines and hub 6 and 7 respectively are also curved longitudinally with substantially the same radius as the member 12, the centers of the arc of curvature being on a line at right angles to the shaft and central of the length of said hub. The sides of the splines are also curved lengthwise and oppositely with the same radius, so that they will converge at their ends, and thus allow lateral as well as vertical turning of the shaft member relative to the casing.

The outer face of the plate 12 is adapted to bear against a packing ring 13 mounted in a cap or casing 14 threaded onto a flange 1ª provided on the end of the member 1.

The outer end of the cap 14 is concentric with the plate 12, and is large enough to allow of a reasonable movement of the said plate therein.

A washer 16 is on the shaft 8 and abuts against the inner end of the flange 1ª having freedom of movement relative thereto, and forms a seat for one end of a helical spring 17, the other end of which bears against the plate 12, to keep the same in constant contact with the casing 14.

A spring 18 is positioned in the casing 1, bearing against the hub 7 at one end and at the other against the sleeve end of the casing.

A plug 19 is screwed into the casing at any appropriate point, so that the casing may be filled with grease to reduce the frictional wear on the splined parts.

Since the splineways 5 are longer than the splined hub 7, the latter may have longitudinal movement therein without disturbing the driving relation of the two parts.

The shaft member 8 may be hollow for its entire length to lighten the same, its inner end being stopped by a plug 20.

The sliding sleeve 12, in conjunction with the member 14, permits of universal swivel and longitudinal movement of the shaft 8 while substantially preventing the escape of the hard grease with which the casing is filled.

From the foregoing description it will be readily seen that I have produced such a device as substantially fulfils the object of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:—

1. A universal joint comprising a tubular casing, a male member projecting therein from one end and arranged to turn therewith and to have longitudinal and angular movement relative thereto, the casing having an enlarged orifice at the end from which the male member projects to accommodate the radius of gyratory movement of the male member, and a plate snugly and slidably mounted on the latter, said plate bearing against the walls of the casing surrounding the orifice and bearing thereagainst while allowing sliding movement relative thereto, with a constant pressure irrespective of the position of the male member relative to the casing.

2. A universal joint comprising a tubular casing, a male member projecting therein from one end and arranged to turn therewith and to have longitudinal and angular movement relative thereto, the casing having an enlarged orifice at the end from which the male member projects to accommodate the radius of gyratory movement of the male member, a plate snugly and slidably mounted on the latter, said plate bearing against the walls of the casing surrounding the orifice while allowing sliding movement relative thereto, and a spring on the male member bearing against the plate and against the casing at a point therein opposite to said plate.

In testimony whereof I affix my signature in presence of two witnesses.

JAMES E. TUCKER.

Witnesses:
ALBERT D. SMITH,
J. J. HENDERSON.